US009521478B2

(12) United States Patent
Jiang et al.

(10) Patent No.: US 9,521,478 B2
(45) Date of Patent: Dec. 13, 2016

(54) THREE-PIECE DEVICE EAR HOOK

(71) Applicant: Google Technology Holdings LLC, Mountain View, CA (US)

(72) Inventors: Peng Jiang, Lawrenceville, GA (US); Ryan P Rye, Lawrenceville, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 429 days.

(21) Appl. No.: 13/947,590

(22) Filed: Jul. 22, 2013

(65) Prior Publication Data

US 2015/0013112 A1 Jan. 15, 2015

Related U.S. Application Data

(60) Provisional application No. 61/842,886, filed on Jul. 3, 2013.

(51) Int. Cl.
*F16M 11/00* (2006.01)
*H04R 1/10* (2006.01)

(52) U.S. Cl.
CPC ............ *H04R 1/105* (2013.01); *H04R 1/1058* (2013.01); *Y10T 24/13* (2015.01); *Y10T 29/49826* (2015.01)

(58) Field of Classification Search
CPC combination set(s) only.
See application file for complete search history.

(56) References Cited

U.S. PATENT DOCUMENTS

| | | | | |
|---|---|---|---|---|
| 5,446,788 A * | 8/1995 | Lucey | H04M 1/05 | 379/430 |
| 5,466,020 A | 11/1995 | Page et al. | | |
| 5,960,094 A * | 9/1999 | Jensen | H04M 1/05 | 381/374 |
| 6,233,344 B1 * | 5/2001 | Clegg | H04R 1/083 | 381/330 |

(Continued)

FOREIGN PATENT DOCUMENTS

| | | |
|---|---|---|
| WO | WO-2012030461 | 3/2012 |
| WO | WO-2012106547 | 8/2012 |

OTHER PUBLICATIONS

"Non-Final Office Action", U.S. Appl. No. 13/942,730, Jan. 20, 2016, 11 pages.

(Continued)

*Primary Examiner* — Monica Millner
(74) *Attorney, Agent, or Firm* — Wolfe-SBMC

(57) ABSTRACT

An ear hook assembly (401) is provided. The ear hook assembly (401) includes a device hook engagement component (405), an ear hook engagement component (406), and a retention sleeve (404). The retention sleeve can include comprising at least one protuberance (1207) extending into the retention sleeve toward an engagement axis (408) of the assembly. One of the device hook engagement component or the ear hook engagement component can include at least two retention sleeve friction engagement components (409,410) radially separated by a cantilevered protuberance engagement component (901) about the engagement axis. The cantilevered protuberance engagement component can include a distal end (1002) biased against the protuberance to retain the device hook engagement component and the ear hook engagement component together.

19 Claims, 11 Drawing Sheets

(56) References Cited

U.S. PATENT DOCUMENTS

| | | | | |
|---|---|---|---|---|
| 6,377,697 | B1 * | 4/2002 | Cheng | H04R 1/083 181/129 |
| 7,609,845 | B2 * | 10/2009 | Chang | H04R 1/1066 381/370 |
| 7,613,292 | B2 * | 11/2009 | te Riet | H04R 1/1066 379/430 |
| 7,664,287 | B2 * | 2/2010 | Neu et al. | H04R 1/105 381/374 |
| 7,925,037 | B2 * | 4/2011 | Te Riet | H04M 1/05 381/330 |
| 8,217,843 | B2 | 7/2012 | Shtrom et al. | |
| 8,411,893 | B2 * | 4/2013 | Ito et al. | H04R 1/105 181/135 |
| 8,611,582 | B2 * | 12/2013 | Lee | H04M 1/05 381/381 |
| 2002/0041697 | A1 * | 4/2002 | MacDonald | H04R 1/10 381/381 |
| 2002/0080989 | A1 * | 6/2002 | Chi-Lin | H04M 1/05 381/374 |
| 2002/0106100 | A1 * | 8/2002 | Kao | H04M 1/05 381/381 |
| 2004/0190745 | A1 * | 9/2004 | Chen | H04R 1/1066 381/381 |
| 2005/0058280 | A1 * | 3/2005 | Ma | H04M 1/05 379/430 |
| 2005/0078847 | A1 * | 4/2005 | Dobras | H04R 1/1058 381/381 |
| 2006/0099993 | A1 | 5/2006 | Leinonen et al. | |
| 2006/0291686 | A1 | 12/2006 | Hlas et al. | |
| 2007/0003095 | A1 * | 1/2007 | Slamka | H04R 1/086 381/381 |
| 2007/0165875 | A1 | 7/2007 | Rezvani et al. | |
| 2007/0223765 | A1 * | 9/2007 | Wang | H04R 1/1066 381/374 |
| 2007/0286409 | A1 * | 12/2007 | Liu | H04M 1/05 379/430 |
| 2008/0051166 | A1 | 2/2008 | Kang et al. | |
| 2008/0188179 | A1 * | 8/2008 | Liu et al. | H04R 1/1066 455/41.2 |
| 2009/0097690 | A1 * | 4/2009 | Liu et al. | H04R 1/1066 381/381 |
| 2009/0134306 | A1 | 5/2009 | Koo | |
| 2011/0268304 | A1 | 11/2011 | Ang et al. | |
| 2012/0052924 | A1 * | 3/2012 | Cybart et al. | H04M 1/05 455/569.1 |
| 2013/0182867 | A1 | 7/2013 | Knowles | |
| 2013/0343595 | A1 * | 12/2013 | Zorkendorfer et al. | H04R 1/10 381/380 |

OTHER PUBLICATIONS

"Restriction Requirement", U.S. Appl. No. 13/942,730, filed Nov. 18, 2015, 6 pages.

"Final Office Action", U.S. Appl. No. 13/942,730, Jun. 22, 2016, 17 pages.

* cited by examiner

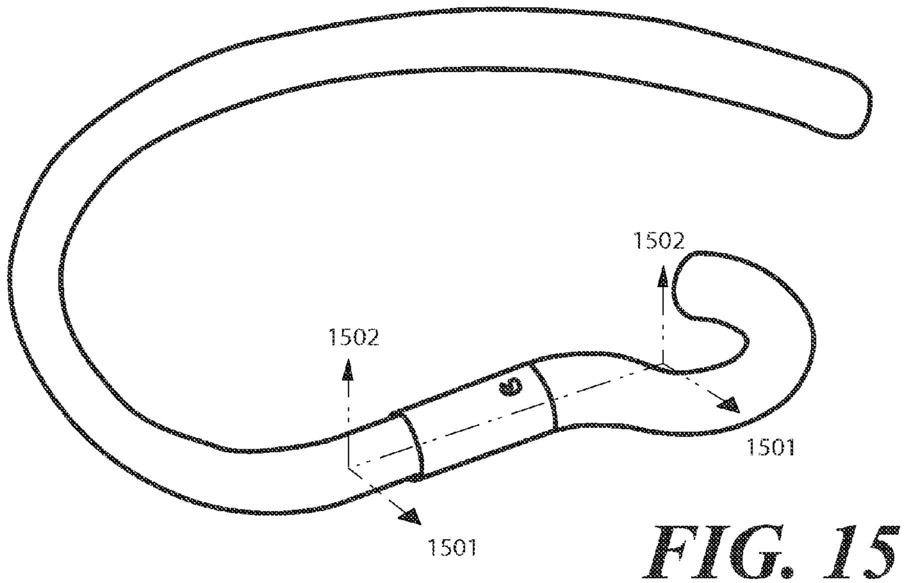
FIG. 15
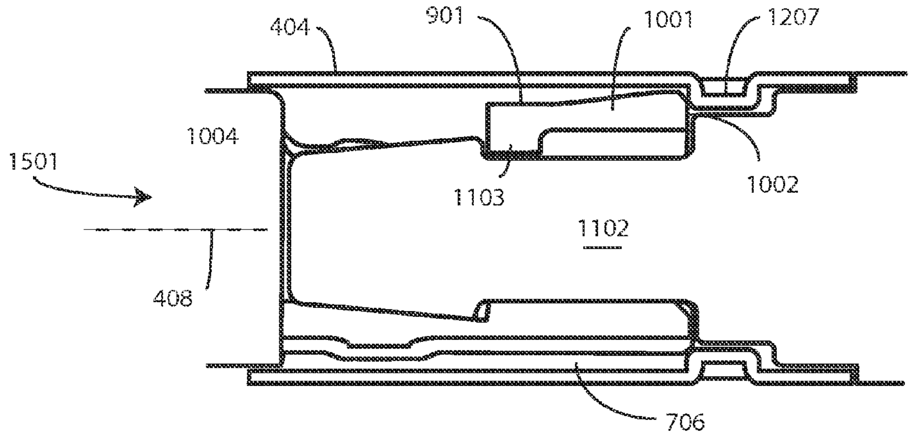
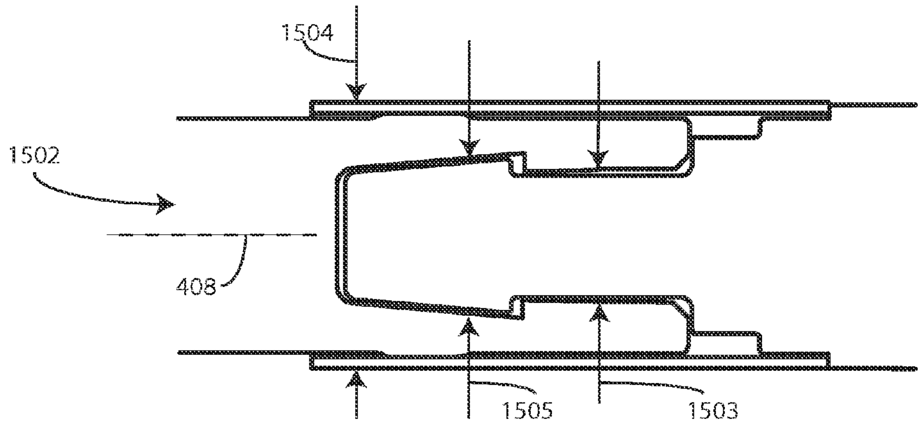

THREE-PIECE DEVICE EAR HOOK

BACKGROUND

Technical Field

This disclosure relates generally to devices, and more particularly to an ear clip for a device.

Background Art

Headsets, such as wireless audio headsets, are becoming increasingly poplar. Wireless headsets, such as those used to wirelessly communicate with a mobile device traditionally include a frame that houses a loudspeaker that is placed over the user's ear. Optionally, a microphone can extend from the housing toward the user's cheek, jaw or mouth.

Users generally desire such headsets to be "hands free," which means that the headset includes a mechanism to keep the headset attached to the ear, thereby freeing the user's hands for other tasks. It is important for such mechanisms to securely hold the headset against the ear. Prior art headsets used a headband to hold the headset against the ear. Headbands are cumbersome and unfashionable to use. Other headsets use a "plug" that is wedged into a user's ear. These plugs are uncomfortable to wear. Additionally, individuals have different ear sizes so one plug may not fit all users.

Due to the drawbacks of these prior art systems, more modern devices employ an ear hook that wraps around the user's ear to keep the headset attached while in use. Many ear hooks are bulky and not especially comfortable to wear. It would be advantageous to have an improved ear hook.

BRIEF DESCRIPTION OF THE DRAWINGS

FIG. 15 illustrates two sectional views of an explanatory engagement configured in accordance with one or more embodiments of the disclosure.

Figure 1:
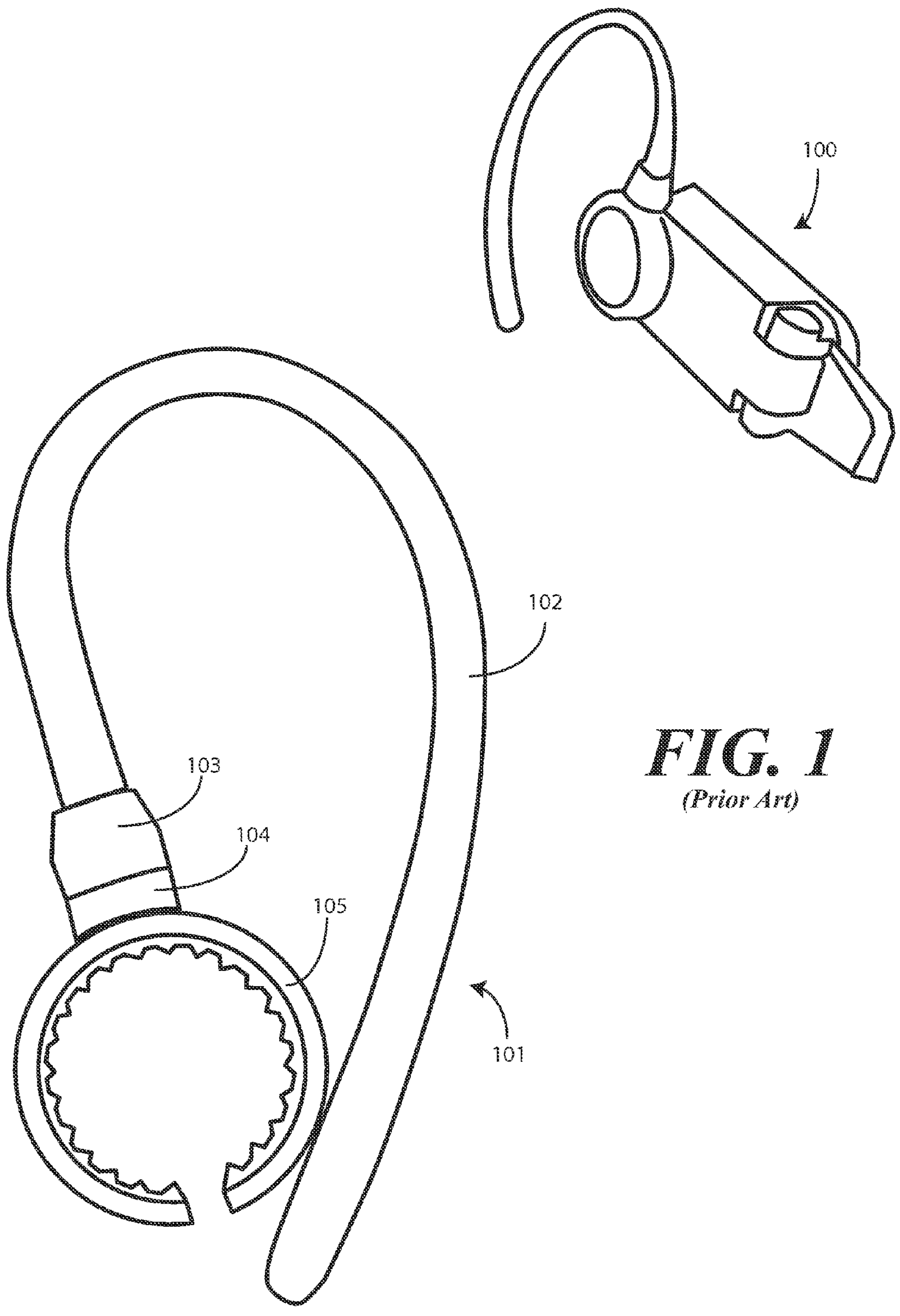
FIG. 1 (Prior Art)
FIG. 1 illustrates an electronic device using a prior art ear hook assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an ear hook assembly suitable for use with an electronic device. In one embodiment, the ear hook assembly only comprises three components: an ear hook, a device hook, and a retaining sleeve. While prior art ear hook assemblies required four or more pieces, embodiments of the disclosure advantageously save cost, assembly time, and allow for thinner ear hook assembly constructs.

In one embodiment, the device hook and the ear hook are mechanically coupled in an engagement. The retaining sleeve is then slid over the engagement to retain the engagement together. In one embodiment, the retaining sleeve is disposed about an ear hook portion that is mechanically coupled at the engagement with a device hook portion to retain the three components together. One of the ear hook portion or the device hook portion is male in one embodiment, while the other is female. For illustrative purposes, the ear hook portion will be illustrated herein as the female component, while the device hook portion will be illustrated as the male component. However, those of ordinary skill in the art having the benefit of this disclosure will understand that the opposite configuration could also be used, i.e., where the device hook portion is the female component and the ear hook portion is the male component.

In one embodiment, the ear hook portion comprises a cantilevered protuberance engagement component and a protuberance passage channel. In one embodiment, the protuberance passage channel includes a fissure that terminates at a gap on the outer surface of the ear hook portion. Where the device hook portion comprises a shaft and an engagement protrusion, the engagement protrusion sits at the gap when the device hook portion is fully inserted into a bore of the ear hook portion. In one embodiment the retention sleeve includes one or more protuberances that extend into the retention sleeve toward an engagement axis of the assembly. When the retention sleeve slides over the engagement, one of the protuberances can advantageously translate through the fissure to aid alignment.

To keep the retention sleeve in place, in one embodiment the ear hook portion comprises a cantilevered protuberance engagement component that includes a beam that separates a distal end and a fulcrum. When the retention sleeve passes over the engagement, a protuberance contorts the beam by deflecting the distal end. Once the protuberance passes over the distal end, the beam contortion is reversed, thereby allowing the distal end to become biased against the protuberance to retain a device hook engagement component and an ear hook engagement component together.

Embodiments of the disclosure offer numerous advantages over prior art ear hook assemblies that use four, five, or more parts. A primary benefit is reduced cost. While the least expensive four-piece ear hook assembly may cost twenty-five cents or more, embodiments of the disclosure reduce this cost to between eighteen and twenty cents, which represents as much as a twenty-eight percent cost savings. A second benefit is easier assembly. Prior art designs require welding and other complicated processes. Embodiments of the disclosure provide an assembly that is simple and quick to assemble by hand. A third benefit is size. The thinnest prior art designs had a diameter of five millimeters or more. By contrast, embodiments of the present disclosure can be reduced to three and a half millimeters in diameter, which translates into increased comfort for the user. Other advantages will become obvious in the discussion that follows.

Figure 2:
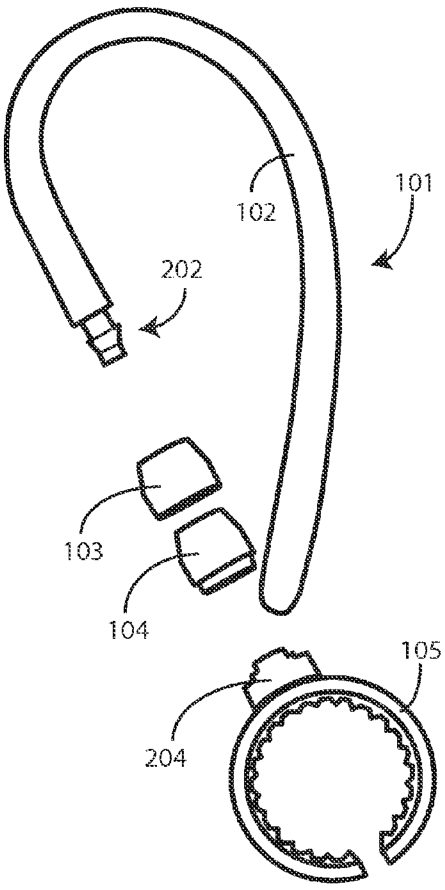
FIG. 2 (Prior Art)
FIG. 2 illustrates an exploded view of a prior art ear hook assembly.

Turning to FIG. 1, illustrated therein is an electronic device 100 employing a prior art ear hook assembly 101. The prior art ear hook assembly 101 includes four pieces: an ear hook 102, a metal sleeve 103, a plastic cap 104, and a plastic hub 105. These parts are shown in an exploded view in FIG. 2.

To assemble the prior art ear hook assembly 101, the plastic cap 104 must be ultrasonically welded or glued to a mounting terminal 204 on the disposed on the plastic hub 105. Once this complex and time-consuming welding process is done, the metal sleeve 103 is placed over the plastic cap 104 for aesthetic purposes only. The metal sleeve 103 does nothing mechanically; it merely provides a metallic break in the otherwise plastic prior art ear hook assembly 101.

Figure 3:
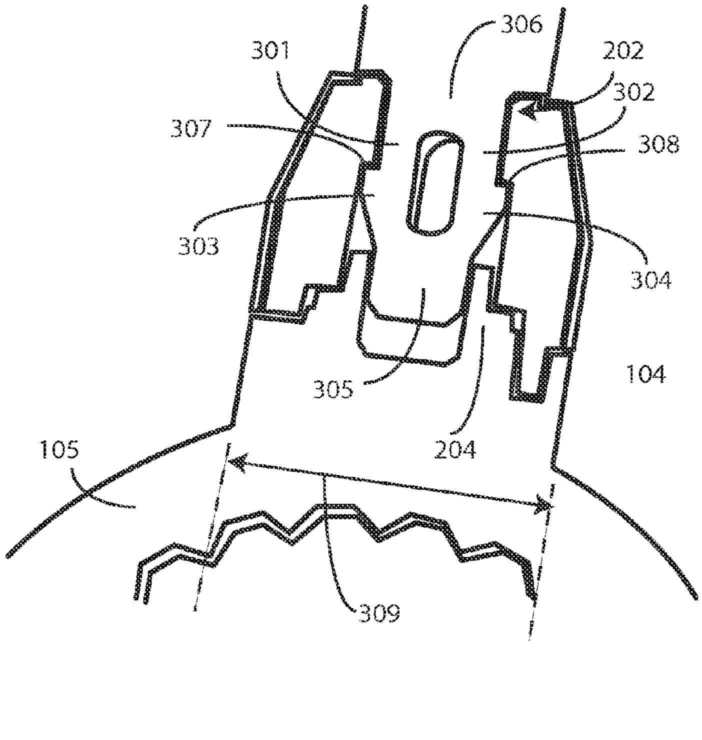
FIG. 3 (Prior Art)
FIG. 3 illustrates a sectional view of a prior art ear hook assembly.

A male snap-fit device 202 is then snapped into the plastic cap 104. This is best shown in the sectional view of FIG. 3. Turning now to FIG. 3, the male snap-fit device 202 includes sidewalls 301,302 that have snap features 303,304 thereon. An extension tube 305 extends from one side of the snap features 303,304, while a shaft 306 extends from the other side of the snap features 303,304. When the male snap-fit device 202 is inserted into the plastic cap 104, the sidewalls 301,302 deflect inward until the snap features 303,304 pass about ledges 307,308. The sidewalls 301,302 then snap back to lock the male snap-fit device 202 into the plastic cap 104.

There are several problems with this prior art design. The first is the thickness. To keep the sidewalls 301,302 from breaking when they deflect, they must be at least a predetermined thickness. Similarly, to provide sufficient retention forces, the ledges 307,308 have to be at least a predetermined thickness. The plastic cap 104 must have a predetermined thickness as well to be able to sonically weld to the mounting terminal 205 of the plastic hub 105. Each of these thicknesses results in a very thick assembly. The assembly of FIG. 3 has a diameter 309 of about five millimeters. As this assembly is placed against a user's ear, it can be uncomfortable to wear.

A second disadvantage is that it requires sonic welding. As noted, above, sonic welding is a complex and time consuming process that increases the overall cost of the assembly. A third problem is that the assembly requires four parts, which also increases cost.

A third disadvantage of the prior art design is that the strength of the "snap joint," formed when the male snap-fit device 202 is inserted into the plastic cap 104, is highly dependent upon a specific alignment during insertion. It is also dependent on very tight dimensional tolerances of the metal sleeve 103. When the metal sleeve 103 is slightly too tall, it stops and/or prevents the male snap-fit device 202 from fully inserting into the plastic cap 104. Accordingly, the male snap-fit device 202 is only only retained in the plastic cap 104 by a mostly friction fit only. Over time, the ear hook 102 eventually separates from the plastic cap 104 because the male snap-fit device slips out of the plastic cap 104. Users are quickly dissatisfied with this situation as the assembly appears to have broken for no reason.

Yet another disadvantage occurs when the plastic cap 104 is not sufficiently welded or attached to the mounting terminal 204. This also causes the assembly to separate. Experimental testing has shown that the only way to address this problem is to increase quality control and manual examination of pieces coming out of the welding or attaching station, which increases the overall cost of the prior art assembly.

Embodiments of the present disclosure provide solutions to each of these problems by providing an ear hook assembly that is only three components, thereby simplifying the design and reducing the cost. Additionally, embodiments of the present disclosure eliminate the need for sonic welding or other complex processes. As noted above, embodiments of the disclosure are simple to assemble by hand. Finally, embodiments of the present disclosure can be much thinner in diameter. This directly results in increased comfort for the user.

Figure 4:
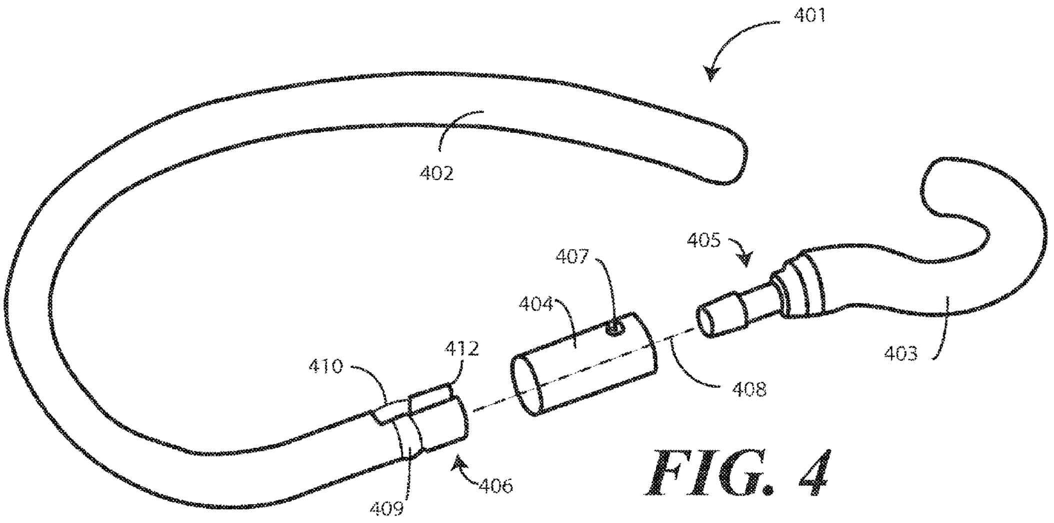
FIG. 4 illustrates an exploded view of an ear hook assembly configured in accordance with one or more embodiments of the disclosure.

Turning to FIG. 4, illustrated therein is an ear hook assembly 401 configured in accordance with one or more embodiments of the disclosure. The ear hook assembly 401 of FIG. 4 is suitable for attaching to an electronic device.

In the illustrative embodiment of FIG. 4, the ear hook assembly 401 includes only three components: an ear hook 402, a device hook 403, and a retention sleeve 404. An engagement between the ear hook 402 and the device hook 403 is facilitated by a device hook engagement component 405 and an ear hook engagement component 406. As noted above, for ease of illustration and explanation, the device hook engagement component 405 has been illustrated as the male engagement component while the ear hook engagement component 406 has been illustrated as the female engagement component. However, it will be clear to those of ordinary skill in the art having the benefit of this disclosure that the opposite convention could be used as well. Said differently, in another embodiment the device hook engagement component 405 can be configured as the male engagement component while the ear hook engagement component 406 is configured as the female engagement component.

In one embodiment, the device hook 403 is manufactured from a rigid plastic material while the ear hook 402 is manufactured from a pliant material. For example, the device hook 403 can be manufactured from nylon, styrene, ABS, polycarbonate, or polycarbonate-ABS, PMMA, PVC, or other polyamide-based thermoplastics in one embodiment. To be pliant about a user's ear and to allow the device hook engagement component 405 to engage the ear hook engagement component 406, the ear hook 402 can be manufactured from nylon or other polyamide-type thermoplastics like those listed above with reference to the device hook 403. In one embodiment, the retention sleeve 404 is manufactured from a metal such as stainless steel.

In this illustrative embodiment, the retention sleeve 404 includes at least one protuberance 407 that extends into the retention sleeve 404 toward an engagement axis 408 of the ear hook assembly 401. The ear hook engagement component 406 includes at least two retention sleeve friction engagement components 409,410. The retention sleeve friction engagement components 409,410 are radially separated by a cantilevered protuberance engagement component.

As will be shown in subsequent figures, in one embodiment the cantilevered protuberance engagement component includes a distal end to retain the device hook engagement component 405 and the ear hook engagement component 406 together when the retention sleeve 404 is placed over both the device hook engagement component 405 and the ear hook engagement component 406. This retention can be performed without any additional parts in one embodiment. Said differently, the three parts shown in FIG. 4 are all that is required to retain the ear hook assembly 401 together. Once this is complete, an electronic device can be coupled to the device hook 403 to form an electronic device assembly.

Figure 5:
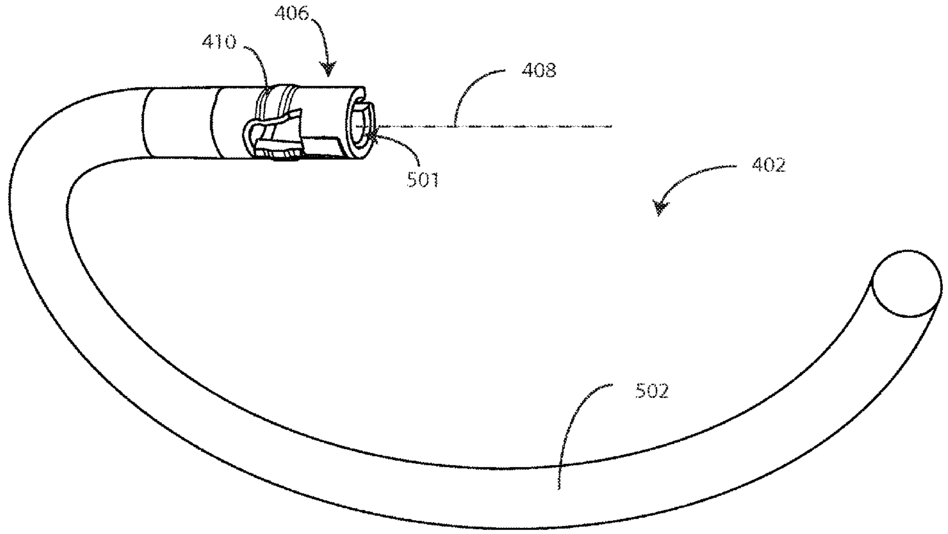
FIG. 5 illustrates a perspective view of one explanatory ear hook configured in accordance with one or more embodiments of the disclosure.
Figure 6:
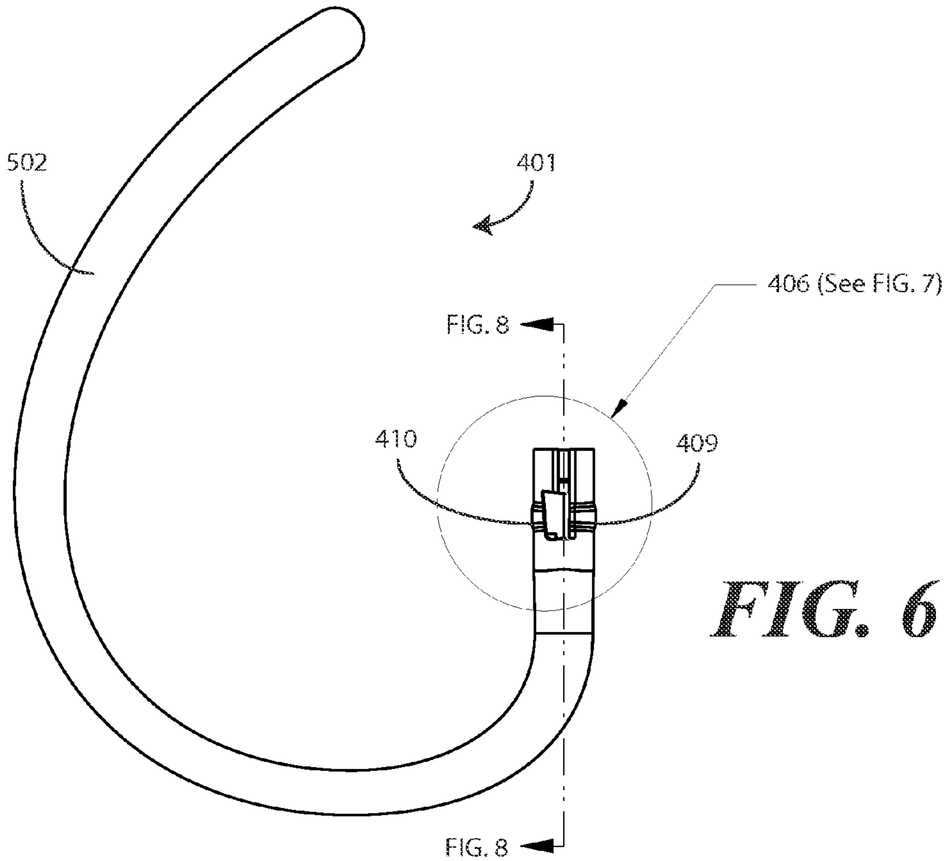
FIG. 6 illustrates an elevation view of one explanatory ear hook configured in accordance with one or more embodiments of the disclosure.
Figure 7:
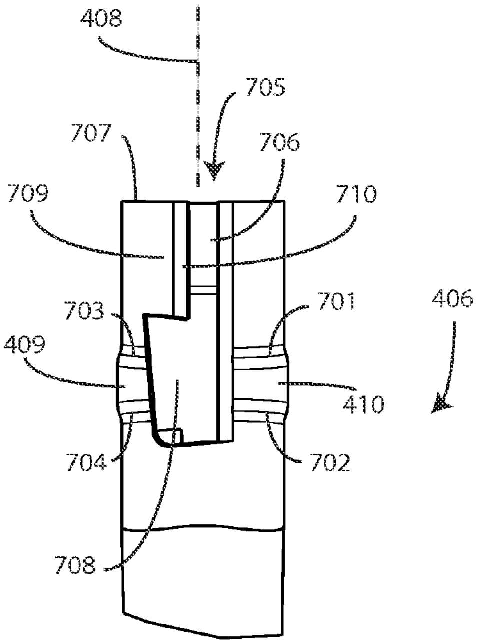
FIG. 7 illustrates an elevation view of one explanatory engagement component configured in accordance with one or more embodiments of the disclosure.
Figure 8:
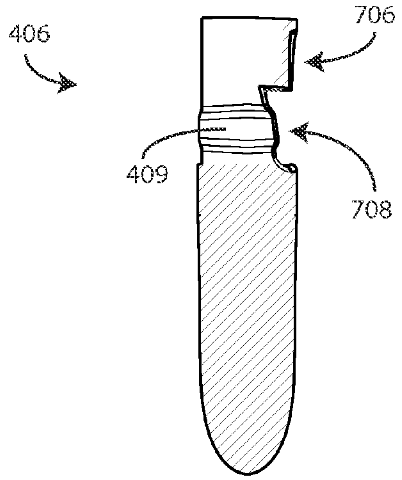
FIG. 8 illustrates another elevation view of one explanatory engagement component configured in accordance with one or more embodiments of the disclosure.
Figure 9:
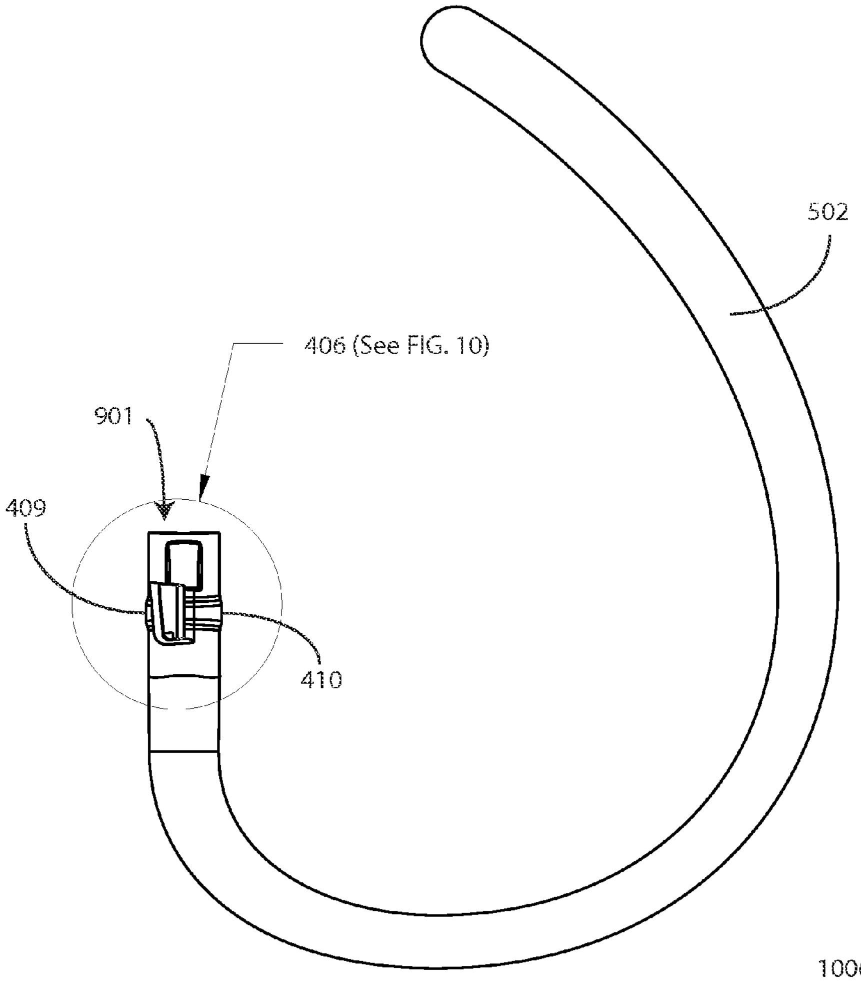
FIG. 9 illustrates another elevation view of one explanatory ear hook configured in accordance with one or more embodiments of the disclosure.
Figure 10:
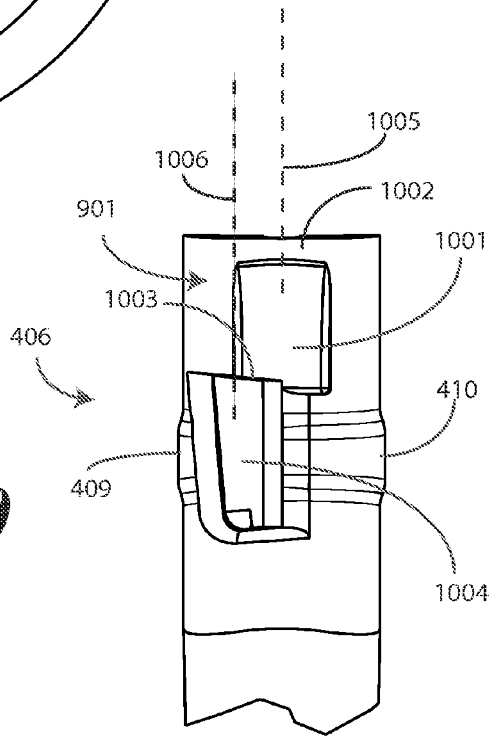
FIG. 10 illustrates another elevation view of one explanatory engagement component configured in accordance with one or more embodiments of the disclosure.

Each of the three components will now be shown in more detail individually. Turning to FIGS. 5-10, the ear hook 402 will first be examined. FIG. 5 illustrates a perspective view, while FIGS. 6 and 9 illustrate opposite elevation views. FIGS. 7, 8, and 10 illustrate various views of the ear hook engagement component 406. FIGS. 7 and 8 illustrate views identified in FIG. 6, while FIG. 10 illustrates a view identified in FIG. 9.

As shown in FIG. 5, an ear hook 502 extends from the ear hook engagement component 406. In one embodiment, the ear hook engagement component 406 includes at least two retention sleeve friction engagement components 409,410. In this illustrative embodiment, the retention sleeve friction engagement components 409,410 are formed by a raised portion of the ear hook engagement component 406. Each retention sleeve friction engagement component 409,410 of this illustrative embodiment also includes sloping sidewalls 701,702,703,704. The retention sleeve friction engagement components 409,410 are configured to apply a loading force against the interior of the retention sleeve (404). When the ear hook engagement component 406 is made from a pliant plastic or rubber material, this loading force creates a frictional force that works to prevent the retention sleeve (404) from sliding. During assembly, however, the retention sleeve (404) is designed to slide across the retention sleeve friction engagement components 409,410. While the inclusion of sloping sidewalls 701,702,703,704 with the retention sleeve friction engagement components 409,410 is optional, and is further not required for assembly, including them can make passage of the retention sleeve (404) across the retention sleeve friction engagement components 409,410 easier during assembly.

In one embodiment, the retention sleeve friction engagement components 409,410 are separated by a cantilevered protuberance engagement component 901, which is most easily illustrated in FIGS. 9 and 10. In one embodiment, the cantilevered protuberance engagement component 901 includes a beam 1001 that separates a distal end 1002 from a fulcrum 1003. In the illustrative embodiment of FIG. 10, the ear hook engagement component 406 also defines a gap 1004 adjacent to the cantilevered protuberance engagement component 901 opposite the distal end 1002. Said differently, the gap 1004 is disposed on one side of the beam 1001 adjacent to the fulcrum 1003 in this embodiment, while the distal end 1002 is disposed on the opposite end of the beam 1001.

In one embodiment, the gap 1004 is off-axis with the beam 1001 of the cantilevered protuberance engagement component 901. For example, as shown in FIG. 10, the beam 1001 has an axis 1005. Additionally, the gap 1004 has an axis 1006. These axes 1005,1006 are non-aligned in this embodiment. In other embodiments, the axes 1005,1006 can be aligned. In one embodiment, the gap 1004 defines an opening between an outer surface of the ear hook engagement component 406 and the bore 501.

As best shown in FIG. 5, in one embodiment the ear hook engagement component 406 defines a bore 501 extending along the engagement axis 408. As will be described in more detail below, in one embodiment the bore is configured to receive the device hook engagement component (405) to form an engagement between the ear hook assembly 401 and the device hook (403). In one embodiment, shown in more detail below with reference to FIG. 12, the device hook engagement component (405) comprises a shaft that terminates in an engagement protrusion that has a diameter greater than the shaft. Accordingly, to accommodate such a configuration, in one embodiment the bore 501 has a larger diameter at the gap 1004 than under the beam 1001.

As best shown in FIG. 7, in one embodiment the retention sleeve friction engagement components 409,410 can also be radially separated by a protuberance passage channel 705. In one embodiment, the protuberance passage channel 705 comprises a fissure 706. In the illustrative embodiment of FIG. 7, the fissure 706 runs from an end 707 of the ear hook engagement component 406 to another gap 708 disposed along an outer surface of the ear hook engagement component 406. In one embodiment, the gap 708 and the fissure 706 define an opening between an outer surface of the ear hook engagement component 406 and the bore 501.

In one embodiment, the fissure 706 and the gap 708 intersect to form an engagement flap 709. As will be described below with reference to FIG. 15, in one embodiment where the ear hook engagement component (406) comprises an engagement protrusion, an end 710 of the engagement flap 709 is configured to contort away from the engagement axis 408 when the engagement protrusion of the ear hook engagement component (406) is inserted into the bore 501 such that it is positioned in the bore along the engagement axis 408 at the engagement flap 709.

Figure 11:
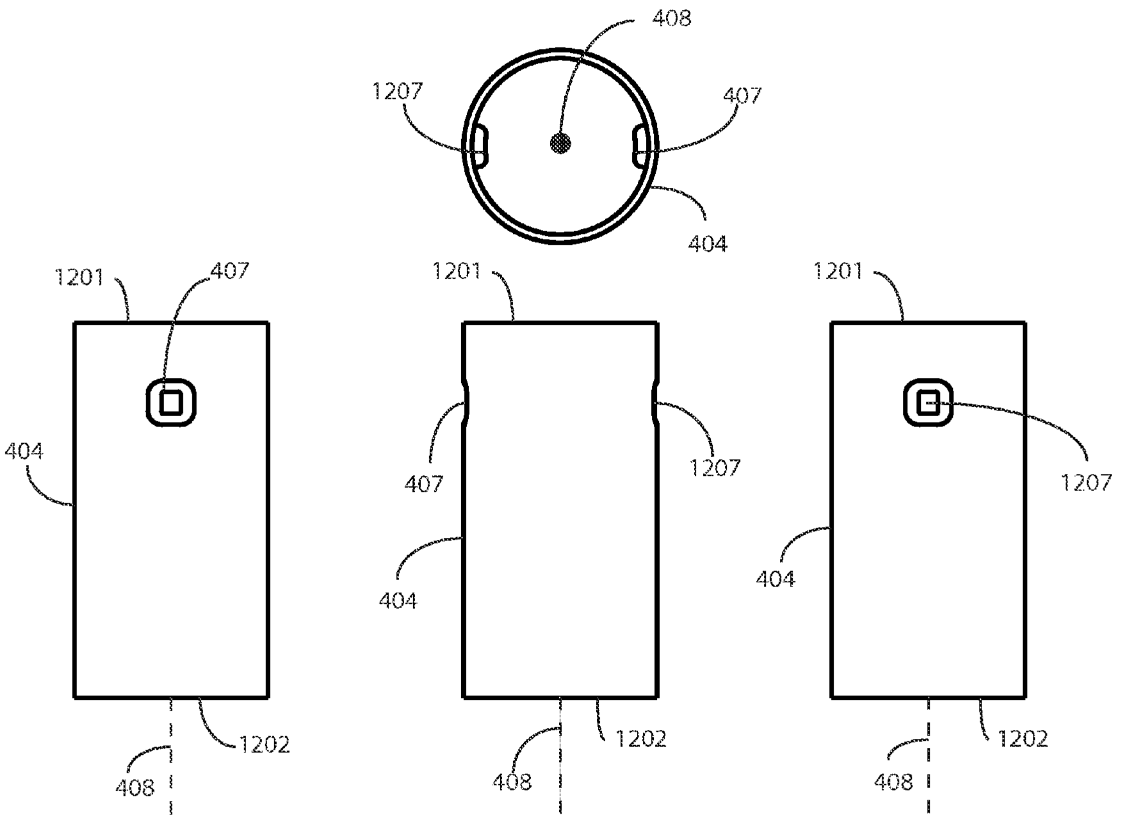
FIG. 11 illustrates one explanatory device hook configured in accordance with one or more embodiments of the disclosure.

Turning now to FIG. 11, illustrated therein is one explanatory device hook 403 configured in accordance with embodiments of the disclosure. The illustrative device hook 403 of FIG. 11 includes a hook 1101 that extends from the device hook engagement component 405. In this embodiment, the device hook engagement component 405 comprises a shaft 1102 and an engagement protrusion 1103. In this embodiment, the shaft 1102 extends from the hook 1101 and terminates at the engagement protrusion 1103. In this embodiment, the engagement protrusion 1103 is frustoconical in shape and has a solid cap 1104.

Figure 12:
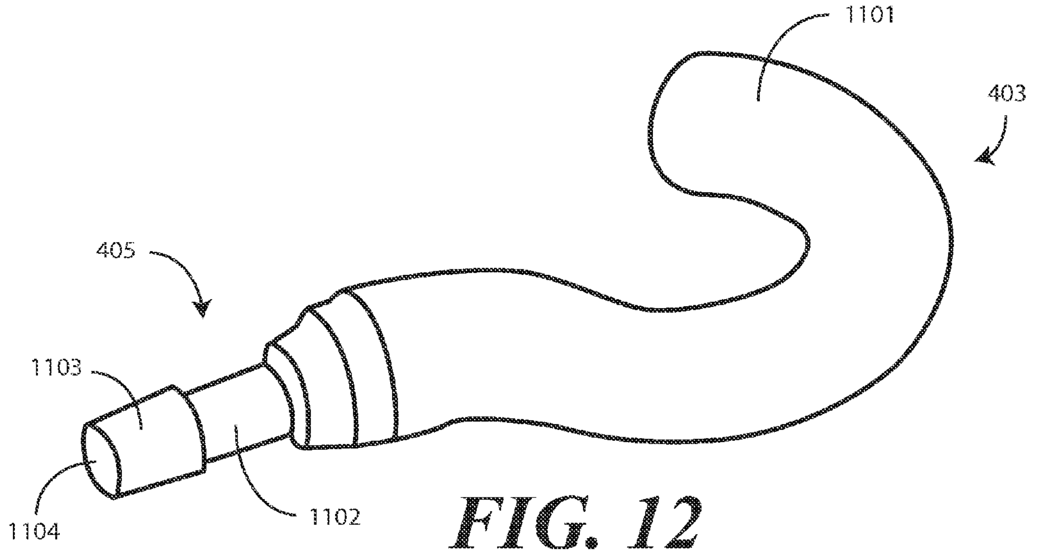
FIG. 12 illustrates various views of one explanatory retention sleeve configured in accordance with one or more embodiments of the disclosure.

Turning now to FIG. 12, illustrated therein is one explanatory retention sleeve 404 configured in accordance with one or more embodiments of the disclosure. The illustrative retention sleeve 404 is manufactured from metal in this embodiment. However, it will be clear to those of ordinary skill in the art having the benefit of this disclosure that the retention sleeve 404 can be manufactured from other materials as well. For example, in another embodiment the retention sleeve 404 is manufactured from plastic. To give the ear hook assembly (401) a more modern look, the retention sleeve 404 could be manufactured from other materials as well, including carbon fiber.

In the illustrative embodiment of FIG. 12, the retention sleeve 404 includes two protuberances 407,1207 that extend into the retention sleeve toward an engagement axis 408. The protuberances 407,1207 of this illustrative embodiment are off-center in that they are closer to one end 1201 of the retention sleeve 404 than the other end 1202.

Figure 13:
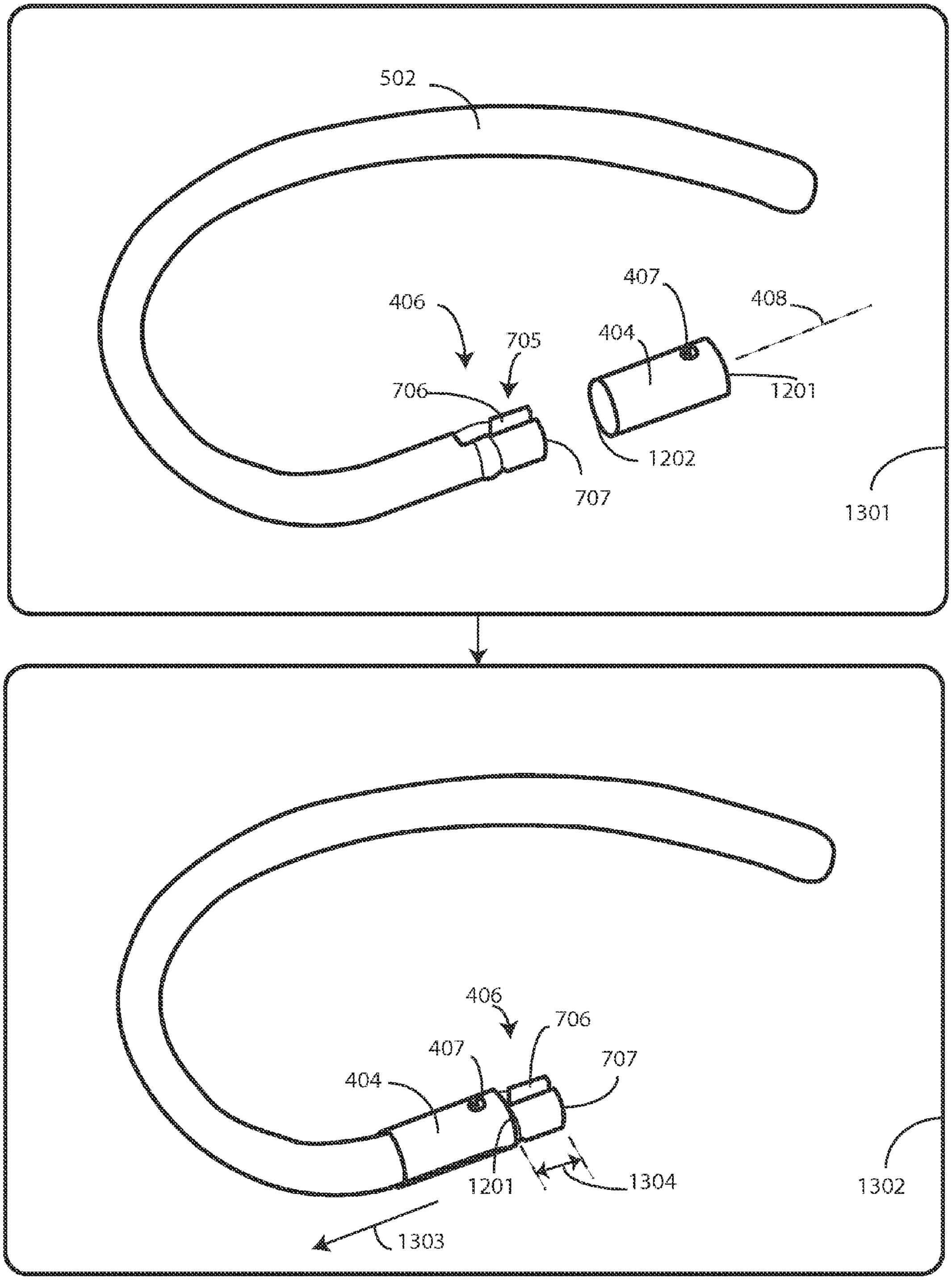
FIGS. 13-14 illustrate a method of assembling an explanatory ear hook assembly configured in accordance with one or more embodiments of the disclosure.
Figure 14:
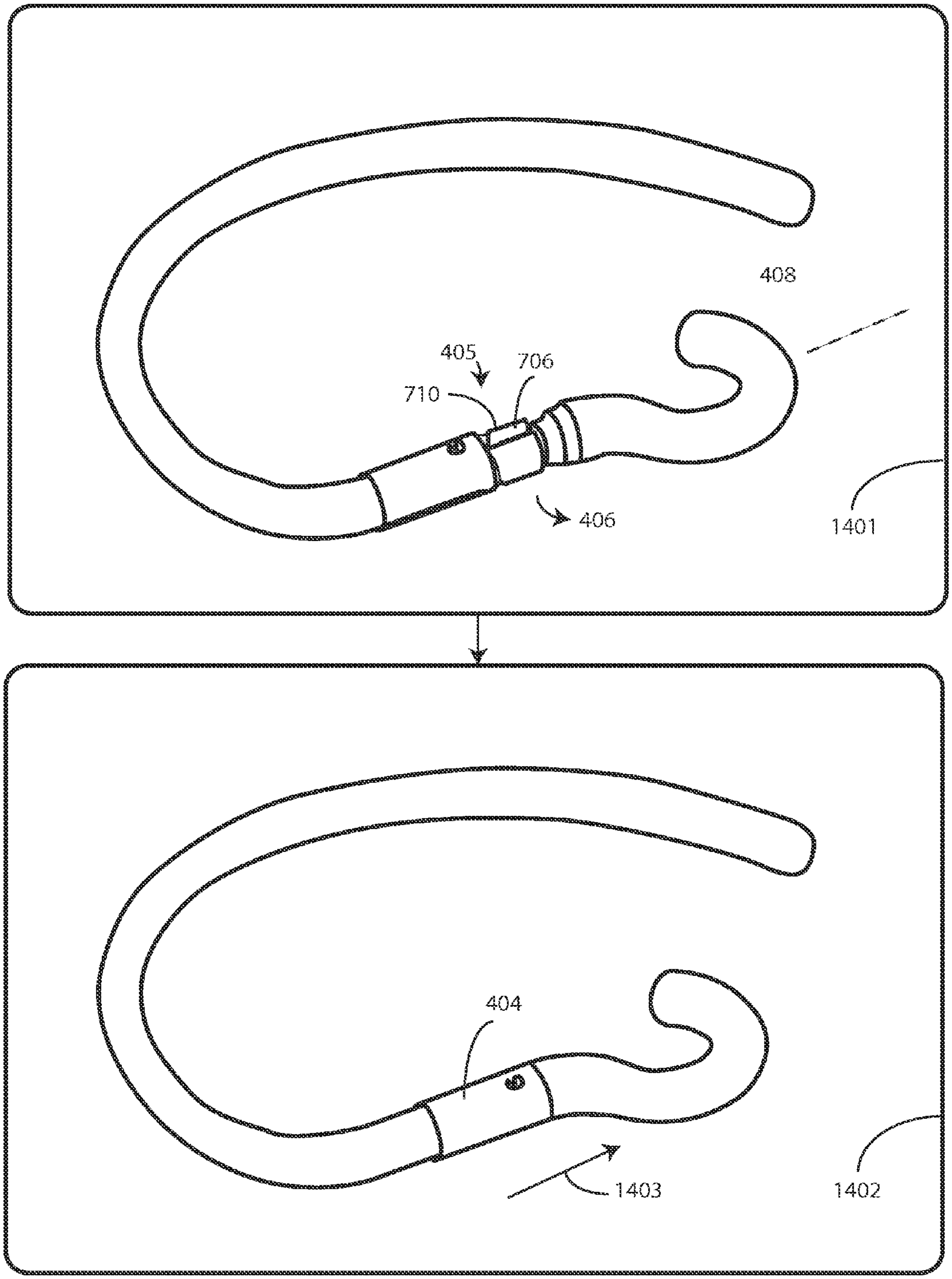

Turning now to FIGS. 13-14, illustrated therein is a method of assembling an ear hook assembly 401 in accordance with one or more embodiments of the disclosure. Beginning at step 1301, the retention sleeve 404 is aligned with the ear hook engagement component 406 along the engagement axis 408. In one embodiment, where the ear hook engagement component 406 includes the protuberance passage channel 705, a protuberance 407 can be aligned with the fissure 706 of the protuberance passage channel 705 as well.

In one embodiment, step 1301 also includes aligning the protuberance 407 away from the ear hook 502 as well. Recall from above that in one embodiment the protuberances are off-center in that they are closer to one end 1201 of the retention sleeve 404 than they are to the other end 1202 of the retention sleeve 404. In one embodiment, step 1301 includes initially aligning the other end 1202 toward the end 707 of the ear hook engagement component 406 and the one end 1201 away from the end 707 of the ear hook engagement component 406. The reason for performing this end alignment is to cause the beam (1001) of the cantilevered protuberance engagement component (901) to contort when engaged by one of the protuberances (1207) of the retention sleeve 404. This will be described in more detail below with reference to FIG. 15.

At step 1302, the retention sleeve 404 is passed in a first direction 1303. In one embodiment, this causes one protuberance 407 to translate through the fissure 706 and into the gap (708). In one embodiment, the retention sleeve 404 is passed beyond the end of the ear hook engagement component 406 by at least a predetermined distance 1304. The predetermined distance 1304 is set such that any contortion of the beam (1001) of the cantilevered protuberance engagement component (901) can be reversed once the protuberance (1207) has sufficiently passed along the beam (1001). Once this is done, a user can hold the retention sleeve 404 such that one end 1201 remains at or beyond the predetermined distance 1304 from the end 707 of the ear hook engagement component 406.

At step 1401, the device hook engagement component 405 is inserted into the bore (501) of the ear hook engagement component 406. Where the device hook engagement component 405 comprises an engagement protrusion (1103) that has a larger diameter than the shaft (1102) of the device hook engagement component 405, this insertion can cause the engagement flap (709) to open. Said differently, the engagement protrusion (1103) can cause an end 710 of the engagement flap (709) to contort away from the engagement axis 408 when the engagement protrusion (1103) is positioned in the bore along the engagement axis 408 at the engagement flap (709). Accordingly, the inserting occurring at step 1401 can cause an opening of the engagement flap (709) defined by the fissure 706. Once the device hook engagement component 405 is fully inserted into the ear hook engagement component 406, the end 710 of the engagement flap (709) can return to its normal position.

At step 1402, the retention sleeve 404 is moved in a second direction 1403 to the end (707) of the ear hook engagement component 406. As will be described in more detail in FIG. 15, in one embodiment this movement causes a protuberance (1207) of the retention sleeve 404 to pass over the cantilevered protuberance engagement component (901) to retain the device hook engagement component 405 and the ear hook engagement component 406 together as an ear hook assembly 401.

Turning now to FIG. 15, illustrated therein are two sectional views 1501,1502 of the engagement 1503 between the ear hook engagement component (406) and the device hook engagement component (405) that help to illustrate the operation some of the internal components. Sectional view 1501 helps to illustrate the operation of the cantilevered protuberance engagement component 901 in particular.

As shown at sectional view 1501, the cantilevered protuberance engagement component 901 includes a beam 1001, a distal end 1002, and a fulcrum 1003. When the shaft 1102 of the device hook engagement component (405) is fully inserted into the bore (501) of the ear hook engagement component (406), the fulcrum 1003 is biased against the shaft 1102 as shown in sectional view 1501.

When the retention sleeve 404 is initially slid over the ear hook engagement component (406) in the first direction (1303) as described in FIG. 13 with reference to steps (1301,1302), protuberance 1207 engages the distal end 1002 of the cantilevered protuberance engagement component 901. The beam 1001 is configured to contort when engaged by the protuberance 1207 translating in a first direction (1303) parallel to the engagement axis 408. Accordingly, the translation causes the beam 1001 to contort by bending downward as viewed in sectional view 1501. However, once the retention sleeve 404 has passed over the ear hook engagement component (406) by the predetermined distance (1304), the beam 1001 returns to the position shown in sectional view 1501.

Then, when the retention sleeve (404) is moved in the second direction (1403), the protuberance 1207 again engages the distal end 1002 of the cantilevered protuberance engagement component 901 to again contort the beam 1001. However, once the retention sleeve (404) has passed in the second direction (1403) to the end (707) of the ear hook engagement component (406), the protuberance 1207 passes beyond the distal end 1002 of the cantilevered protuberance engagement component 901. The beam 1001 then returns to the position shown in sectional view 1501 and becomes biased against the protuberance 1207 to retain the device hook engagement component (405) and the ear hook engagement component (406) together. Said differently, the uncontorted beam 1001 is configured to prevent movement of the retention sleeve 404 along a second direction (1403) opposite the first direction (1303).

Another feature shown in sectional views 1501,1502 relates to the bore (501). As shown in sectional view 1502, in one embodiment, the bore (501) in one embodiment has a diameter 1505 that is greater along the gap 1004 disposed adjacent to the cantilevered protuberance engagement component 901 than is a diameter 1504 along the fissure 706.

Another feature shown in the sectional views 1501,1502 relates to the thickness of the overall ear hook assembly 401. As noted above, using the unique and extraordinary three-part assembly shown in FIG. 15, the diameter 1504 of the assembly is less than four millimeters. In one embodiment, the diameter 1504 is 3.5 millimeters.

Figure 16:
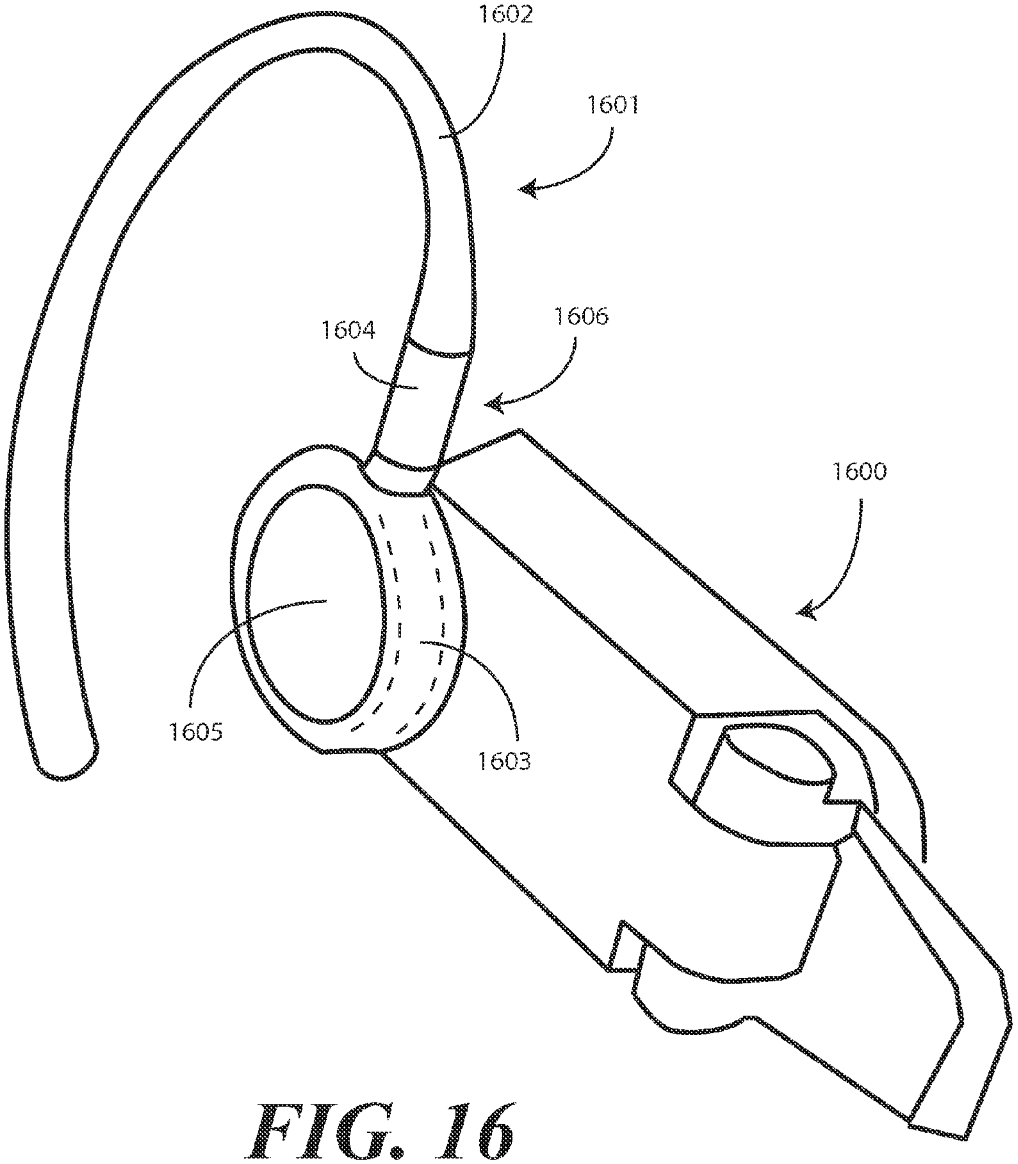
FIG. 16 illustrates an electronic device employing an explanatory engagement configured in accordance with one or more embodiments of the disclosure.

Turning now to FIG. 16, illustrated therein is an electronic device 1600 that includes an ear hook assembly 1601 that includes only three components: an ear hook 1602, a device hook 1603, and a retaining sleeve 1604. The device hook 1603 has been coupled to the electronic device 1600 at a connection 1605. The device hook 1603 and the ear hook 1602 are mechanically coupled in an engagement 1606 that is retained by the retaining sleeve 1604. In this embodiment, the retaining sleeve 1604 is disposed about an ear hook portion that is mechanically coupled to a device hook portion at the engagement 1606. The retaining sleeve 1604 is disposed about both the ear hook portion and the device hook portion at the engagement 1606 to retain the three components of the ear hook assembly 1601 together.

Figure 17:
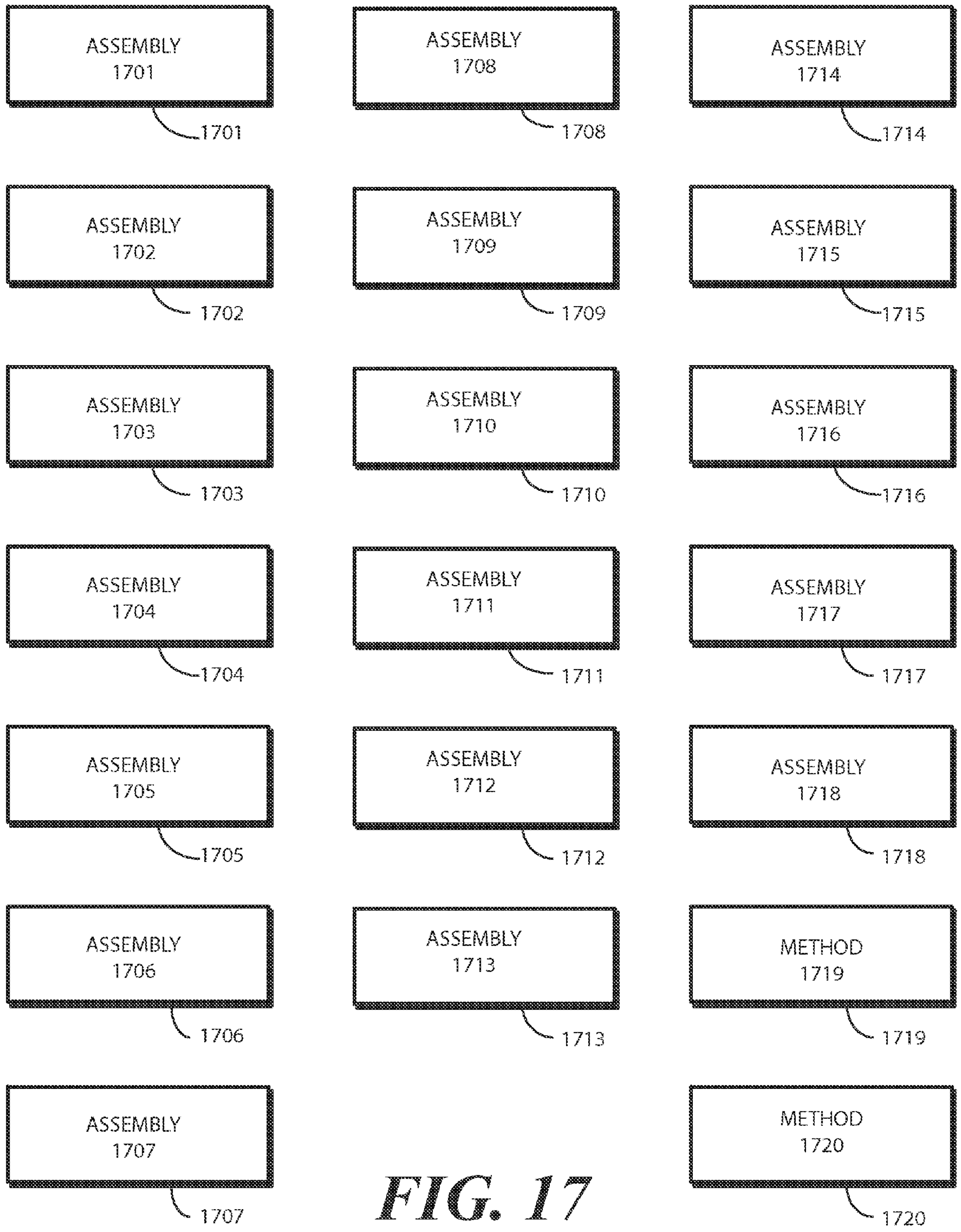
FIG. 17 illustrates various embodiments of the disclosure.

Turning now to FIG. 17, illustrated therein are various embodiments of the disclosure. At 1701, an assembly comprises a device hook engagement component, an ear hook engagement component, and a retention sleeve. At 1701, the retention sleeve comprises at least one protuberance extending into the retention sleeve toward an engagement axis of the assembly. At 1701, one of the device hook engagement component or the ear hook engagement component comprises at least two retention sleeve friction engagement components. At 1701, the at least two retention sleeve friction engagement components are radially separated by a cantilevered protuberance engagement component about the engagement axis. At 1701, the cantilevered protuberance engagement component comprises a distal end biased against the at least one protuberance to retain the device hook engagement component and the ear hook engagement component together.

At 1702, the one of the device hook engagement component or the ear hook engagement component of 1701 defines a gap adjacent to the cantilevered protuberance engagement component opposite the distal end. At 1703, the one of the device hook engagement component or the ear hook engagement component of 1701 further defines a bore extending along the engagement axis. At 1703, the gap of 1702 defines an opening between an outer surface of the one of the device hook engagement component or the ear hook engagement component and the bore.

At 1704, another of the one of the device hook engagement component or the ear hook engagement component of 1701 comprises a shaft terminating at an engagement protrusion. At 1705, the engagement protrusion of 1704 is frustoconical in shape.

At 1706, the cantilevered protuberance engagement component of 1701 comprises a fulcrum and beam. At 1706, the fulcrum is biased against the shaft when inserted into the bore.

At 1707, the beam of 1706 is configured to contort when engaged by the at least one protuberance translating in a first direction parallel to the engagement axis. At 1708, the beam of 1706 is configured to prevent movement of the retention sleeve along a second direction opposite the first direction.

At 1709, the ear hook engagement component of 1701 comprises an ear hook extending distally therefrom. At 1709, the device hook engagement component of 1701 comprises a hook extending therefrom.

At 1710, the at least two retention sleeve friction engagement components of 1701 are further separated by a protuberance passage channel. At 1711, the protuberance passage channel of 1710 comprises a fissure terminating at a gap to define an engagement flap.

At 1712, the one of the device hook engagement component or the ear hook engagement component of 1701 further comprises a bore extending along the engagement axis. At 1712, another of the one of the device hook engagement component or the ear hook engagement component of 1701 comprises an engagement protrusion. At 1712, an end of the engagement flap is to contort away from the engagement axis when the engagement protrusion is positioned in the bore along the engagement axis at the engagement flap.

At 1713, the one of the device hook engagement component or the ear hook engagement component of 1701 further comprises a bore extending along the engagement axis. At 1713, the bore is larger in diameter along the gap than along the fissure. At 1714, the one of the device hook engagement component or the ear hook engagement component of 1701 is less than four millimeters in diameter.

At 1715, an assembly for an electronic device comprises only three components. At 1715, the three components comprise an ear hook, a device hook, and a retaining sleeve. At 1715, device hook and the ear hook are mechanically coupled in an engagement. At 1715, the engagement is retained by the retaining sleeve. At 1716, the retaining sleeve of 1715 is disposed about an ear hook portion mechanically coupled at the engagement with a device hook portion to retain the only three components together.

At 1717, the ear hook portion of 1715 comprises a cantilevered protuberance engagement component and a protuberance passage channel. At 1717, the protuberance passage channel is separated from a retention sleeve friction engagement component by a fissure. At 1717, the fissure terminates at a gap disposed on an outer surface of the ear hook portion.

At 1718, a method of assembling an ear hook comprises passing a retention sleeve in a first direction beyond an end of one of a device hook engagement component or an ear hook engagement component by at least a predetermined distance. At 1718, the method also comprises inserting another of the device hook engagement component or the ear hook engagement component into a bore of the one of the device hook engagement component or the ear hook engagement component. At 1718, the method also comprises moving the retention sleeve in a second direction toward the end to pass a protuberance of the retention sleeve over a cantilevered protuberance engagement component to retain the one of the device hook engagement component or the ear hook engagement component together as an assembly.

At 1719, the passing of 1718 further comprises translating another protuberance through a fissure. At 1720, the inserting of 1718 further comprises opening an engagement flap defined by the fissure with the another of the device hook engagement component or the ear hook engagement component into the one of the device hook engagement component or the ear hook engagement component.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An assembly, comprising:

a device hook engagement component;

an ear hook engagement component; and a retention sleeve comprising at least one protuberance extending into the retention sleeve toward an engagement axis of the assembly;

one of the device hook engagement component or the ear hook engagement component comprising:

at least two retention sleeve friction engagement components radially separated by a cantilevered protuberance engagement component about the engagement axis;

the cantilevered protuberance engagement component comprising a distal end biased against the at least one protuberance to retain the device hook engagement component and the ear hook engagement component together, wherein the device hook engagement component, ear hook engagement component and retention sleeve are configured to be assembled along the engagement axis, said engagement axis comprising a single axis along which said device hook engagement component, ear hook engagement component and retention sleeve are assembled.

2. The assembly of claim 1, the one of the device hook engagement component or the ear hook engagement component defining a gap adjacent to the cantilevered protuberance engagement component opposite the distal end.

3. The assembly of claim 2, the one of the device hook engagement component or the ear hook engagement component further defining a bore extending along the engagement axis, the gap defining an opening between an outer surface of the one of the device hook engagement component or the ear hook engagement component and the bore.

4. The assembly of claim 3, another of the one of the device hook engagement component or the ear hook engagement component comprising a shaft terminating at an engagement protrusion.

5. The assembly of claim 4, wherein the engagement protrusion is frustoconical.

6. The assembly of claim 4, the cantilevered protuberance engagement component comprising a fulcrum and beam, the fulcrum biased against the shaft when inserted into the bore.

7. The assembly of claim 6, wherein the beam is configured to contort when engaged by the at least one protuberance translating in a first direction parallel to the engagement axis.

8. The assembly of claim 7, wherein the beam is configured to prevent movement of the retention sleeve along a second direction opposite the first direction.

9. The assembly of claim 1, further comprising a hook extending distally from the device hook engagement component and an ear hook extending distally from the ear hook engagement component.

10. The assembly of claim 1, the at least two retention sleeve friction engagement components further radially separated by a protuberance passage channel.

11. The assembly of claim 10, the protuberance passage channel comprising a fissure terminating at a gap to define an engagement flap.

12. The assembly of claim 11, the one of the device hook engagement component or the ear hook engagement component further comprising a bore extending along the engagement axis, another of the one of the device hook engagement component or the ear hook engagement component comprising an engagement protrusion, an end of the engagement flap to contort away from the engagement axis when the engagement protrusion is positioned in the bore along the engagement axis at the engagement flap.

13. The assembly of claim 11, the one of the device hook engagement component or the ear hook engagement component further comprising a bore extending along the engagement axis, the bore larger in diameter along the gap than along the fissure.

14. A method of assembling an ear hook, comprising:

passing a retention sleeve in a first direction beyond an end of one of a device hook engagement component or an ear hook engagement component by at least a predetermined distance;

inserting another of the device hook engagement component or the ear hook engagement component into a bore of the one of the device hook engagement component or the ear hook engagement component; and moving the retention sleeve in a second direction toward the end to pass a protuberance of the retention sleeve over a cantilevered protuberance engagement component to retain the one of the device hook engagement component or the ear hook engagement component together as an assembly.

15. The method of claim 14, the passing further comprising translating another protuberance through a fissure.

16. The method of claim 15, the inserting further comprising opening an engagement flap defined by the fissure with the another of the device hook engagement component or the ear hook engagement component into the one of the device hook engagement component or the ear hook engagement component.

17. An assembly, comprising:

a device hook engagement component;

an ear hook engagement component; and a retention sleeve comprising at least one protuberance extending into the retention sleeve toward an engagement axis of the assembly;

one of the device hook engagement component or the ear hook engagement component comprising:

at least two retention sleeve friction engagement components radially separated by a cantilevered protuberance engagement component about the engagement axis;

the cantilevered protuberance engagement component comprising a distal end biased against the at least one protuberance to retain the device hook engagement component and the ear hook engagement component together, the one of the device hook engagement component or the ear hook engagement component defining a gap adjacent to the cantilevered protuberance engagement component opposite the distal end.

18. An assembly, comprising:

a device hook engagement component;

an ear hook engagement component; and a retention sleeve comprising at least one protuberance extending into the retention sleeve toward an engagement axis of the assembly;

one of the device hook engagement component or the ear hook engagement component comprising:

at least two retention sleeve friction engagement components radially separated by a cantilevered protuberance engagement component about the engagement axis;

the cantilevered protuberance engagement component comprising a distal end biased against the at least one protuberance to retain the device hook engagement component and the ear hook engagement component together; and a hook extending distally from the device hook engagement component and an ear hook extending distally from the ear hook engagement component.

19. An assembly, comprising:

a device hook engagement component;

an ear hook engagement component; and a retention sleeve comprising at least one protuberance extending into the retention sleeve toward an engagement axis of the assembly;

one of the device hook engagement component or the ear hook engagement component comprising:

at least two retention sleeve friction engagement components radially separated by a cantilevered protuberance engagement component about the engagement axis;

the cantilevered protuberance engagement component comprising a distal end biased against the at least one protuberance to retain the device hook engagement component and the ear hook engagement component together;

the at least two retention sleeve friction engagement components further radially separated by a protuberance passage channel.

* * * * *